United States Patent [19]

Swis et al.

[11] 4,174,627
[45] Nov. 20, 1979

[54] TEST STAND FOR AN INTERNAL COMBUSTION ENGINE TESTING SYSTEM

[75] Inventors: Philip E. Swis; Jere L. Hill, both of Armada, Mich.

[73] Assignee: Sun Electric Corporation, Crystal Lake, Ill.

[21] Appl. No.: 906,643

[22] Filed: May 16, 1978

[51] Int. Cl.² .......................................... G01M 15/00
[52] U.S. Cl. ........................................ 73/116; 73/471; 248/560
[58] Field of Search ................ 73/116, 460, 461, 462, 73/463, 464, 465, 466, 467, 468, 471, 472, 473; 248/3, 6, 8, 9; 254/93 HP

[56] References Cited

U.S. PATENT DOCUMENTS

| | | | |
|---|---|---|---|
| 2,534,918 | 12/1950 | Kroft et al. | 73/463 |
| 3,377,849 | 4/1968 | Lebow | 73/134 |
| 3,505,863 | 4/1970 | Lucia | 73/116 |
| 3,527,087 | 9/1970 | Converse et al. | 73/117.3 |
| 3,538,759 | 11/1970 | Schrom | 73/116 |
| 3,552,196 | 1/1971 | Schrom | 73/117.2 |
| 3,648,819 | 3/1972 | Converse et al. | 198/19 |
| 3,697,865 | 10/1972 | Smith et al. | 324/16 R |
| 3,730,366 | 5/1973 | Berends | 254/93 HP X |
| 3,834,221 | 9/1974 | Swis et al. | 73/116 |
| 3,938,377 | 2/1976 | Converse et al. | 73/117 |
| 3,942,363 | 3/1976 | Swis et al. | 73/116 |

*Primary Examiner*—Jerry W. Myracle
*Attorney, Agent, or Firm*—Allegretti, Newitt, Witcoff & McAndrews

[57] ABSTRACT

A test stand for an internal combustion engine testing system is disclosed. The test stand permits the engine to substantially freely vibrate such that engine imbalance can be measured. The test stand includes a cradle and a support assembly, having a housing and an inflatable bladder member. The bladder member supports the cradle during the testing operation.

22 Claims, 2 Drawing Figures

TEST STAND FOR AN INTERNAL COMBUSTION ENGINE TESTING SYSTEM

BACKGROUND OF THE INVENTION

The present invention generally relates to a system for testing the vibrational imbalance of a mechanism, such as a diesel V-8 engine, and more particularly relates to an apparatus for permitting the mechanism to vibrate under test conditions, such that the imbalance can be determined and measured.

Internal combustion engines must be balanced for maximum, trouble-free life. That is, the vibration of an internal combustion engine, resulting from rotation of its parts during operation, must be within an acceptable tolerance. Otherwise the vibration will be sufficient to cause excessive wear, metal fatigue and failure.

To achieve this balance in the mass production of engines, the individual components of the rotating assembly, e.g., the crank shaft, pistons, piston rods, flywheel and starter pulley, are machined to precise dimensions and individually balanced, both statically and dynamically. Each assembled engine is also tested, and if necessary, the imbalance is reduced to within an acceptable level.

Engine imbalance is generally reduced by adding weight to or subtracting weight from the flywheel or starter pulley of the engine, in amounts and at locations to counteract the imbalance. To determine amount and location, the velocity of the vibration is monitored in the planes of the flywheel and starter pulley to identify the magnitude and location of discrete front and rear imbalance torques.

For accurate measurements of imbalance, the engine vibration must not be unduly influenced or dampened by the test system. That is, the apparatus upon which the engine is mounted must permit substantially free, uninhibited vibration. This requires that the engine mount or test stand add only a minimum quantity of parasitic damping mass to the engine under investigation.

Minimum influence by the test stand is particularly difficult to achieve with a diesel V-8 engine. This is due to the fact that a diesel V-8 engine vibrates substantially in a horizontal plane and any effort to support the engine tends to inhibit vibration in that plane.

SUMMARY OF THE INVENTION

It is thus an object of the present invention to provide an improved test stand for an engine testing system. Another object is to provide a engine test stand which permits substantially free vibration in a single plane.

Yet another object is a test stand upon which the engine can be readily mounted and aligned. It is also an object of the present invention to provide an engine mount which can be loaded by an overhead crane.

Still another object is a test stand which will withstand and absorb the shock of repeated loading to provide long life and long term stability. A further object is to provide an inexpensive and compact test stand.

In a principal aspect, the present invention is a test stand, operable in a first and second state. The test stand includes a base or bed, a cradle to receive the engine, and a series of support assemblies.

In the first state of operation, the cradle rests on the bed. In the second state, i.e., the testing state, the support assemblies raise the cradle off the bed and permit the cradle to vibrate, with minimum influence, in accordance with the vibration of the engine.

Each support assembly includes a housing and an inflatable bladder member therein. During second state operation, the bladder member is inflated, engaging and lifting the cradle. The cradle is thus supported by the bladder member, such that the cradle substantially freely moves in the horizontal plane.

These and other features, aspects and objects of the present invention are set forth in the following description of a preferred embodiment.

BRIEF DESCRIPTION OF THE DRAWING

A preferred embodiment of the present invention will be described, in detail, with reference to the drawing, wherein.

DESCRIPTION OF A PREFERRED EMBODIMENT

Figure 1:
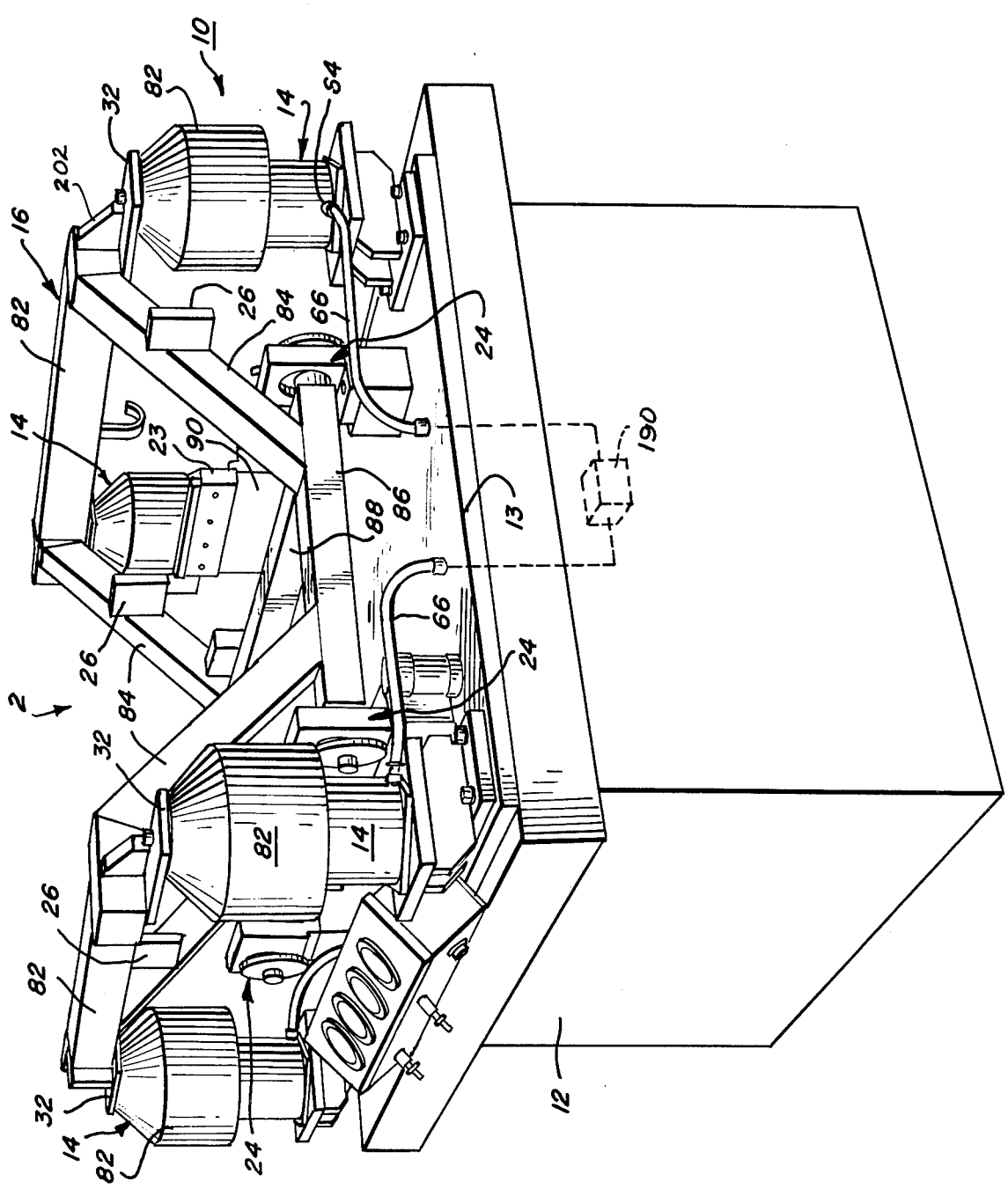
FIG. 1 is a partial perspective view of an engine test system incorporating a preferred embodiment of the present invention.
Figure 2:
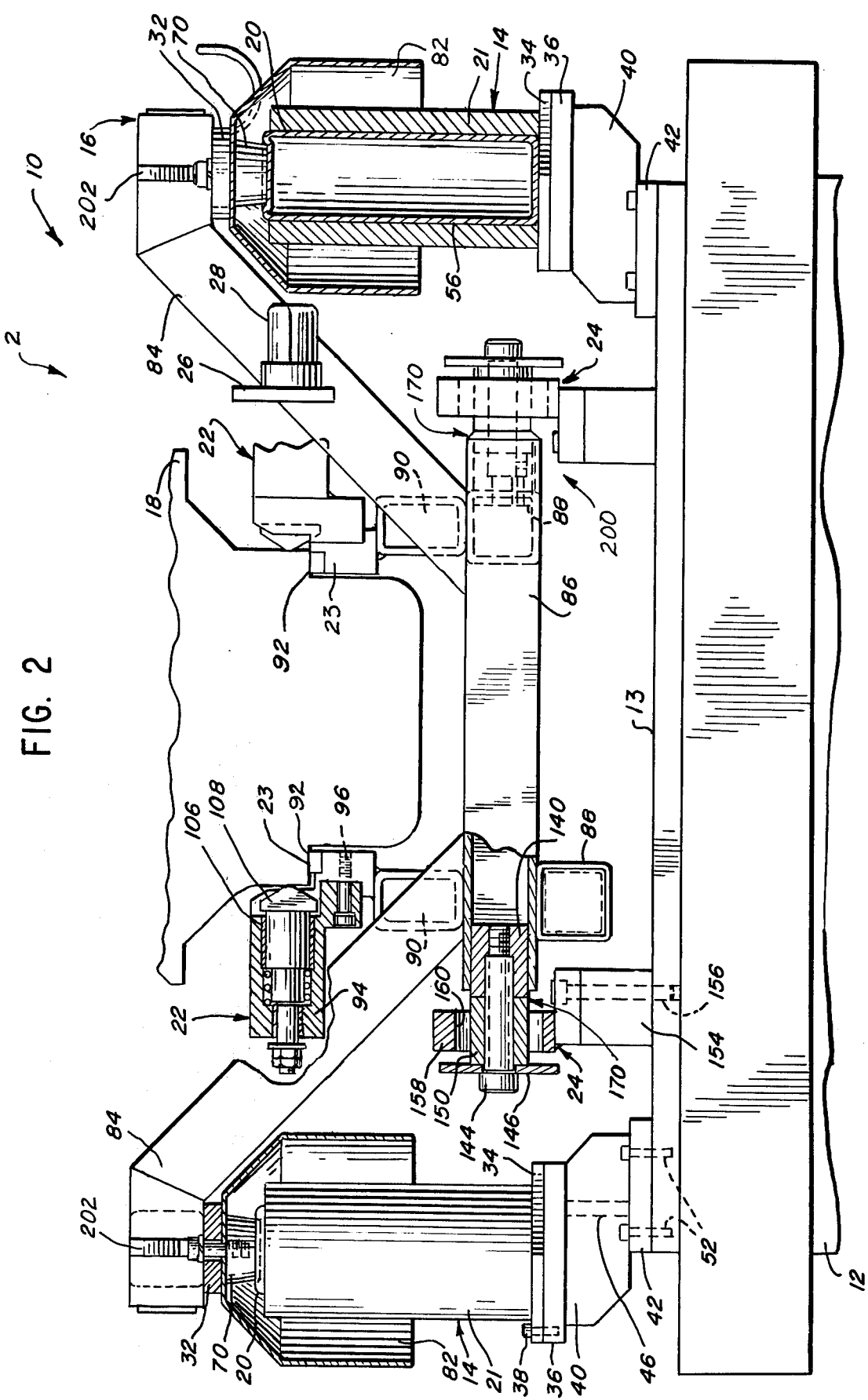
FIG. 2 is a back view of the preferred embodiment shown in FIG. 1.

FIGS. 1 and 2 generally illustrate a system 2 for testing the performance characteristics of an internal combustion engine 18, shown in partial outline in FIG. 2. More particularly, the system 2 measures the rotational imbalance and vibration of the engine 18.

The system 2 includes a preferred embodiment of the present invention, shown as a test stand 10. The test stand 10 permits substantially free vibration of the engine 18 in a horizontal plane during testing thereof. That is, the test stand 10 has minimum effect or influence upon the operational characterstics of the engine 18.

The test stand 10 is preferably used to test diesel engines, which vibrate substantially within a horizontal plane due to imbalance, and this description is therefore limited accordingly. It is to be understood, however, that application of the test stand 10 is not limited to testing diesel engines, or even to testing internal combustion engines.

The test stand 10 includes a base 12, support assemblies 14, a cradle 16 and spool members 70. The base 12 has a flat, substantially retangular bed 13.

The support assemblies 14 are substantially identical and secured to the bed 13 in spaced relationship, near the corners thereof. Referring particularly to FIG. 2, each support assembly 14 includes an inflatable, resilient bladder member 20 and an upright, substantially cylindrical housing 21. One end of the housing 21 is rigidly affixed to the bed 13.

The bladder member 20 fits within the housing 21. Each bladder member 20 is connected to inflation means, generally designated 190, for selectively inflating and deflating the bladder member 20.

The cradle 16 is substantially U-shaped and includes a pair of raised pad members 23. When mounted on the cradle 16, preferably by an overhead crane (not shown), the engine 18 rests on the pad members 23.

The cradle 16 also includes lift plates 32, substantially vertically aligned with the support assemblies 14, respectively. In this preferred embodiment, the spool members 70 are secured to the underside of the lift plates 32.

Each spool member 70 has a substantially frustoconical shape. As secured, the spool member 70 tapers or narrows away from the lift plate 32.

The test stand 10 is operable in two states. In the first state, the bladder members 20 are deflated and the cradle 16 rests upon the bed 13.

During first state operation, the engine 18 is mounted on the cradle 16 and started or connected to a drive motor (not shown). The speed (RPM) of the engine 18 is increased to the test speed, and the test stand 10 is then placed in the second state.

During second state operation, the cradle 16 is raised off the bed 13 by inflation of the bladder members 20. The bladder members 20 expand to engage the respective spool members 70 and lift the cradle 16. Once inflated to a predetermined pressure, each bladder member 20 supports and partially encompasses the spool member 70, as best shown in FIG. 2.

In this second state of the test stand 10, the cradle 16 is substantially free to horizontally vibrate in accordance with the engine 18. That is, the engine 18 will vibrate, due to imbalance, without substantial influence or damping from the test stand 10.

The imbalance measurements are made and noted, and the bladder members 20 are then deflated. Thereafter the engine 18 is removed from the cradle 16 and transferred to an imbalance reduction station (not shown).

During the first state operation, the bladder members 20 do not engage the spool members 70, thereby protecting the bladder members 20 from the exaggerated vibration encountered at "crossover" engine speed. At "crossover" speed, static and dynamic imbalance coexist and cumulatively cause a violent vibration. In testing of this nature, only dynamic imbalance is significant and thus a test speed above "crossover" must be attained.

In the second state, the inflatable bladder member 20 extends beyond the open end of the housing 21 and spool member 70, under the weight of the cradle 16 and engine 18, presses thereon. The bladder member 20 responsively bulges to partially encompass and grip the spool member 70. Preferably, twenty to forty percent of the spool member 70 is encompassed.

A suitable bladder member 20 is presently manufactured by the Firestone Rubber Company, under the name of "Airmount." A six inch diameter bladder member 20 is preferable, and the preferred inflation pressure is sixty to ninety psi.

The structural details of the test stand 10 will now be described. Referring primarily to FIG. 2, a base plate 34 is welded to each housing 21 and secured to a first support plate 36 by machine screws 38. The support plate 36 is welded to leg plates 40, secured to a second support plate 42. The second support plate 42 is fastened, by screws 52, to the base 13. A reinforcing wall 46 is fastened between the leg plates 40.

Each bladder member 20 has a wall 56 of rubber and high strength nylon cord. The bladder member 20 is selectively inflated and deflated through a fitting 64 in the housing 21 and tubing 66, connected to inflation means 190.

A series of cradle support members 24 is secured to the base 13. Each cradle support member 24 incudes a block 154 and a stop plate 158 secured thereto. The block 154 is fastened to the bed 13 by a bolt 156. The stop plate 158 defines an aperture 160.

The U-shaped cradle 16 includes upper side members 82 and lower side members 88, interconnected by angled end members 84. The lower side members 88 are interconnected by cross end members 86.

The pad members 32 are secured to and above the lower side members 88 by a support weldment 90. The pad members 23 are positioned to engage a substantially flat underside surface 92 of the engine 18, thereby aligning the engine 18 on the cradle 16. The engine 18 is preferably supported such that its rotational or vibrational axis, due to imbalance, is substantially vertical and its center of gravity is centrally located within the cradle 16.

The lift plates 32 are substantially horizontal and extend longitudinally from the upper side members 82. The attachment is strengthened by a brace 202.

The cradle 16 also includes clamps 22 to secure the engine 18 during the test. For clarity, only a pair of clamps 22 is shown and only in FIG. 2.

Each clamp 22 includes a housing 94 and a spring-biased piston 106, having a beveled head 108. The housing 94 is fastened to the pad member 23 by a bolt 96, such that the piston 106 operates slightly above the pad member 23.

There are preferably three clamps 22, two secured to one pad member 23 and one secured to the opposite pad member 23. The clamps 22 are positioned such that the engine 18 engages the beveled heads 108 during loading, thereby forcing the pistons 106 into the housing 94. Once seated, the engine 18 is positionally secured by the spring-biased pistons 106.

The cradle 16 also includes mounting pads 26 and rest arms 170. The mounting pads 26 are secured to the angled end members 84 and permit the attachment of transducers 28, shown only in FIG. 2, to the cradle 16. The mounting pads 26 are positioned such that the transducers 28 can monitor the vibrational velocity of the engine 18 in the planes of the flywheel (not shown) and starter pulley (not shown).

The rest arms 170 extend outwardly from the two cross end members 86 to engage the cradle support members 24. Each rest arm 170 includes a bolt 144, a metal disc 146 and substantially cylindrical elastomeric tube or snubber 150. The bolt 144 is threaded into a plug 140, secured in each end of the cross end members 86.

As shown in FIG. 2, the bolt 144 and snubber 150 pass through the aperture 160 of the stop plate 158. In the first state of the test stand 10, the snubber 150 rests upon the stop plate 158; in the second state, the snubber 150 has a rest position substantially coaxial with the aperture 160.

The stop plate 158 and metal disc of the rest arm 170 cooperatively define stop means, generally designated 200, for limiting the vibration or movement of the cradle 16. This substantially avoids the possibility of damage to the system 2 due to violent vibration.

The snubber 150 and the top portion of the pad member 23 are preferably diethane or urethane and substantially absorb the engine loading shock. This substantially increases the life of the test stand 10 and reduces the possibility of damage to the engine 18.

The test stand also includes a series of protective shield 82 to partially enclose the housing 21 and bladder members 20. In this preferred embodiment, the protective shield 82 is secured to the cradle 16, interposing the spool member 70 and lift plate 32. Both the spool member 70 and protective shield are affixed by a bolt 74.

The shield 82 protects the bladder member 20 from heat, as radiated and transmitted through the cradle 16.

The shield also avoids debris accumulation in the housing 21.

A single preferred embodiment of the present invention has been disclosed. It is to be understood, however, that modifications and changes can be made without departing from the true scope and spirit of the present invention, as defined by the following claims. For example, a palletized engine could be tested by merely altering the cradle 16 and incorporating additional support assemblies 14.

What is claimed is:

1. An apparatus for permitting a mechanism mounted thereon to substantially freely vibrate, said apparatus being operable in a first state and a second state and comprising, in combination:
   a platform;
   cradle means for receiving said mechanism, said cradle means resting upon said platform in said first state; and
   support means for supporting said cradle means above said platform in said second state and for permitting said cradle means to substantially freely move in response to said mechanism;
   said support means including a housing, having a lower end secured to said platform and an open upper end, and an inflatable bladder member within said housing, said inflatable bladder member being deflated in said first state and inflated in said second state to engage and lift said cradle means.

2. An apparatus as claimed in claim 1 further comprising a spool member interposing said cradle means and said inflatable bladder member in said second state.

3. An apparatus as claimed in claim 2 wherein said spool member is secured to said cradle means in substantially vertical alignment with said housing.

4. An apparatus as claimed in claim 3 further comprising means for selectively inflating and deflating said inflatable bladder member.

5. An apparatus as claimed in claim 3 wherein said spool member tapers towards said inflatable bladder member.

6. An apparatus as claimed in claim 3 wherein said inflatable bladder member preferably encompasses twenty to forty percent of said spool member in said second state.

7. An apparatus as claimed in claim 3 further comprising a shield adapted to substantially enclose said housing and to protect said inflatable bladder member.

8. An apparatus as claimed in claim 7 wherein said shield is secured to said cradle means and encloses said spool member.

9. An apparatus as claimed in claim 1 wherein said cradle means includes alignment means for substantially centrally aligning said mechanism on said cradle means.

10. An apparatus as claimed in claim 9 wherein said cradle means further includes clamp means for securing said mechanism.

11. An apparatus as claimed in claim 1 further comprising stop means for limiting the vibration of said cradle means.

12. An apparatus as claimed in claim 1 further comprising a cradle support secured to said platform, said cradle means resting upon said cradle support in said first state.

13. An apparatus as claimed in claim 12 wherein said cradle support has an aperture, said cradle means including a rest arm extending through said aperture, said cradle support and said rest arm cooperatively defining stop means for limiting movement of said cradle means.

14. An apparatus as claimed in claim 13 wherein said rest arm includes a resilient tube to engage said cradle support in said first state and partially absorb the shock of loading said mechanism on said cradle means.

15. In a system for measuring the vibration of an engine, an improved test stand comprising, in combination:
   a base;
   a housing secured to said base and having an open upper end;
   an inflatable bladder within said housing and operable in an inflated state and a deflated state;
   a cradle for receiving said engine, said cradle being at rest upon said base whenever said inflatable bladder is in said deflated state and being raised off said base and supported by said inflatable bladder whenever said inflatable bladder is in said inflated state; and
   a spool member interposing said cradle and said inflatable bladder in said inflated state.

16. An improved test stand as claimed in claim 15 wherein said spool member is secured to said cradle, said inflatable bladder engaging said spool member during inflation to said inflated state.

17. An improved test stand as claimed in claim 16 wherein said spool members tapers away from said cradle.

18. An improved test stand as claimed in claim 15 further comprising a cradle support member, having an aperture, secured to said base, said cradle resting upon said cradle support member in said deflated state.

19. An improved test stand as claimed in claim 18 wherein said cradle includes a rest arm extending through said aperture and engaging said cradle support member in said deflated state, said cradle support member and said rest arm cooperatively defining stop means for limiting the movement of said cradle.

20. An improved test stand as claimed in claim 15 wherein said cradle includes means for aligning and securing said engine.

21. An improved test stand as claimed in claim 15 further comprising a protective shield for said housing and said inflatable bladder.

22. An improved test stand as claimed in claim 21 wherein said protective shield is attached to said cradle.

* * * * *